(12) United States Patent
Sallas

(10) Patent No.: US 9,429,669 B2
(45) Date of Patent: Aug. 30, 2016

(54) SEISMIC SOURCE AND METHOD FOR SINGLE SWEEP INTERMODULATION MITIGATION

(71) Applicant: CGGVERITAS SERVICES SA, Massy Cedex (FR)

(72) Inventor: John Sallas, Plano, TX (US)

(73) Assignee: CGG SERVICES SA, Massy (FR)

( * ) Notice: Subject to any disclaimer, the term of this patent is extended or adjusted under 35 U.S.C. 154(b) by 595 days.

(21) Appl. No.: 13/836,138

(22) Filed: Mar. 15, 2013

(65) Prior Publication Data

US 2014/0112098 A1 Apr. 24, 2014

Related U.S. Application Data

(60) Provisional application No. 61/716,150, filed on Oct. 19, 2012.

(51) Int. Cl.
*G01V 1/36* (2006.01)
*G01V 1/00* (2006.01)
*G01V 1/37* (2006.01)

(52) U.S. Cl.
CPC .............. *G01V 1/36* (2013.01); *G01V 1/005* (2013.01); *G01V 1/37* (2013.01); *G01V 2210/1214* (2013.01); *G01V 2210/324* (2013.01)

(58) Field of Classification Search
CPC .......... G01V 1/36; G01V 1/37; G01V 1/005; G01V 2210/1214; G01V 2210/324; G01V 1/04; G01V 1/38; G01V 1/28; G01V 1/18; H04B 11/00; B64B 1/34; G01P 15/09

USPC ......... 367/14, 23, 38, 41, 44, 134, 166, 178, 367/189, 190; 702/17; 181/119, 121
See application file for complete search history.

(56) References Cited

U.S. PATENT DOCUMENTS

| | | | |
|---|---|---|---|
| 4,346,461 A | 8/1982 | Muir | |
| 5,550,786 A * | 8/1996 | Allen | G01V 1/366 367/23 |
| 5,719,823 A * | 2/1998 | Earp | G01S 7/539 367/138 |
| 5,815,465 A * | 9/1998 | Turgut | G01V 1/38 367/15 |

(Continued)

OTHER PUBLICATIONS

John J. Sallas, :How do hydraulic vibrators work? A look inside the black box, Geophysical Prospecting, vol. 58, Issue 1, Jan. 2010, pp. 3-17.

(Continued)

*Primary Examiner* — Luke Ratcliffe
*Assistant Examiner* — Amienatta M Ndure Jobe
(74) *Attorney, Agent, or Firm* — Patent Portfolio Builders PLLC

(57) ABSTRACT

A method for calculating intermodulation noise generated with one or more land seismic sources. The method includes receiving seismic data (g) generated by actuating the one or more land seismic source with a single sweep; selecting a number of detectors (a-f) that detect a subset (ga-gf) of the seismic data (g); estimating earth responses (ha1-hf1) based on (i) the subset seismic data (ga-gf) and (ii) a ground force (gf) of the one or more land seismic source; calculating plural intermodulation noises (noiseA1-noiseF1) for the number of detectors based on the earth responses (ha1-hf1); and removing the plural intermodulation noises (noiseA1-noiseF1) from corresponding detector signals (ga-gf) to mitigate the intermodulation noise effect.

20 Claims, 12 Drawing Sheets

(56) References Cited

U.S. PATENT DOCUMENTS

| | | | | |
|---|---|---|---|---|
| 6,161,076 A * | 12/2000 | Barr | ............... | G01V 1/36 367/117 |
| 7,859,945 B2 * | 12/2010 | Sallas | ............... | G01V 1/005 367/189 |
| 8,321,134 B2 * | 11/2012 | Al-Saleh | ............... | G01V 1/364 702/14 |
| 2004/0174770 A1 * | 9/2004 | Rees | ............... | G01N 29/07 367/7 |
| 2006/0250891 A1 * | 11/2006 | Krohn | ............... | G01V 1/005 367/38 |
| 2009/0010103 A1 * | 1/2009 | Sallas | ............... | G01V 1/005 367/41 |
| 2010/0195434 A1 * | 8/2010 | Menger | ............... | G01V 1/005 367/16 |

OTHER PUBLICATIONS

Notice of Allowance and Fee(s) due in related U.S. Appl. No. 13/836,499 mailed Apr. 6, 2016.

* cited by examiner

SEISMIC SOURCE AND METHOD FOR SINGLE SWEEP INTERMODULATION MITIGATION

CROSS REFERENCE TO RELATED APPLICATIONS

The present application claims the benefit of priority under 35 U.S.C. §119(e) to U.S. Provisional Application 61/716,150 filed on Oct. 19, 2012, the entire contents of which is hereby incorporated by reference.

BACKGROUND

1. Technical Field

Embodiments of the subject matter disclosed herein generally relate to methods and systems for mitigating seismic noise artifacts due to intermodulation distortion (IMD) that may be present in the recorded seismic data.

2. Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine whether the oil and gas reservoirs are located.

Geophysical prospectors generate seismic waves in order to probe the subsurface (e.g., for imaging the earth). These acoustic waves may be generated from an explosive, implosive, impulsive, or a vibratory source executing swept-frequency (chirp) or random sequence. A recording of the acoustic reflection and refraction wavefronts that travel from the source to a receiver are used to produce a seismic field record. Variations in the travel times of the reflection events in these field records indicate the position of reflection and/or refraction surfaces within the earth.

IMD noise (intermodulation distortion noise) results from the modulation of signals containing two or more different frequencies in a non-linear system. The non-linear system of particular concern is the earth coupling and the two or more different frequencies may be (i) the frequency emitted by the source and (ii) harmonics of the same frequency. The intermodulation between each frequency component will form additional signals at frequencies that are not just at harmonic frequencies (integer multiples) of either, but also at the sum and difference frequencies of the original frequencies. There are other nonlinear mechanisms in the vibrator itself that produce IMD distortion products, but since these effects are included in the measured ground force signal, they are incorporated into the source signature signal so that their distortion artifacts can be mitigated directly by performing a source signature deconvolution as a data processing step.

A swept-frequency or chirp type seismic source may use a long pilot signal such as 2 to 64 seconds to ensure sufficient energy is imparted to the earth. With a swept frequency type source, the energy is emitted in the form of a sweep of regularly increasing (upsweep) or decreasing (downsweep) frequency in the seismic frequency range. The vibrations of the source are controlled by a control system, which can control the frequency and phase of the seismic signals. These sources are low energy and, thus, this causes noise problems that may affect the recorded seismic data. For example, the source generated harmonic energy may be an additional source of energy manifesting as noise, distortion or interference with recorded data. Generally for chirps, the source emits only one frequency at a time and its harmonics, so nonlinear coupling effects in the earth will result in noise that is indistinguishable from harmonic noise. With vibrator rocking, usually front to back or side to side, sub-harmonic energy can also be produced and any IMD products between sub-harmonics, fundamental or harmonics are also indistinguishable from sub-harmonic noise and its multiples. One exception is due to amplitude tapers that are generally applied at the start and end of a chirp. The taper intervals are usually between 100 to 1000 ms in duration. During the amplitude taper at the beginning or end of a chirp, the reference contains more than one frequency due to the amplitude modulation of the chirp signal. Thus, there is some potential for IMD production during taper intervals since more than two frequencies, which are not harmonics or sub-harmonics of one another, are simultaneously generated and when the vibrator output signal enters the nonlinear coupling, IMD seismic waves are emitted in addition to fundamental, harmonic and sub-harmonic waves.

A bigger problem is in the case when pseudorandom sequences are employed. The temporal frequency content of random signals is rich in spectral diversity, i.e., many frequencies are generated simultaneously. Thus, the potential for IMD noise interference in seismic records is much greater when pseudorandom sequences are used. In correlated shot records, the IMD noise is most evident on near offset traces (these correspond to receivers close to a vibrator). The IMD noise that is seen in correlated shot gathers is primarily linked to strong arrival events like first break events and surface waves.

Therefore, there are instances when vibratory sources may generate harmonics, sub-harmonics and IMD noise which can cross-feed with signals from other sources, giving misleading results when the signals are processed to separate the signals from each source. In addition, the harmonics are a source of noise that can mask weak reflection signals from deeper layers.

Currently, for reducing the seismic survey time, multiple sources are deployed at close locations and are actuated simultaneously, thus, reducing the time necessary to complete the survey. However, using multiple sources at the same time only increase the IMD noise. Multiple sources may be used if some means for distinguishing between signals emanating from the different sources can be provided. There are various methods for reducing the harmonic noise and cross-feed but none is capable of addressing related noises, e.g., subharmonic and/or IMD noise.

Thus, there is a need to develop a method, a source and/or a seismic survey system that is capable of imparting energy to the earth in such a way that IMD noise may be mitigated.

SUMMARY

According to an exemplary embodiment, there is a method for calculating an intermodulation noise effect generated with one or more land seismic sources. The method includes receiving seismic data (g) generated by actuating the one or more land seismic source with a single sweep; selecting a number of detectors that detect a subset (ga-gf) of the seismic data (g); estimating earth responses (ha1-hf1) based on (i) the subset seismic data (ga-gf) and (ii) a ground force (gf) of the one or more land seismic source; calculating plural intermodulation noises (noiseA1-noiseF1) for the number of detectors (a-f) based on the earth responses (ha1-hf1); and removing the plural intermodulation noises (noiseA1-noiseF1) from corresponding detector signals (ga-gf) to mitigate the intermodulation noise effect.

According to another exemplary embodiment, there is a computing device for calculating an intermodulation noise effect generated with one or more land seismic sources. The device includes an interface for receiving seismic data (g) generated by actuating the one or more land seismic source with a single sweep; and a processor connected to the interface. The processor is configured to select a number of detectors that detect a subset (ga-gf) of the seismic data (g), estimate earth responses (ha1-hf1) based on (i) the subset seismic data (ga-gf) and (ii) a ground force (gf) of the one or more land seismic source, calculate plural intermodulation noises (noiseA1-noiseF1) for the number of detectors (a-f) based on the earth responses (ha1-hf1), and remove the plural intermodulation noises (noiseA1-noiseF1) from corresponding detector signals (ga-gf) to mitigate the intermodulation noise effect.

According to another exemplary embodiment, there is a non-transitory computer readable medium including computer executable instructions, wherein the instructions, when executed by a computer, implement the method discussed above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
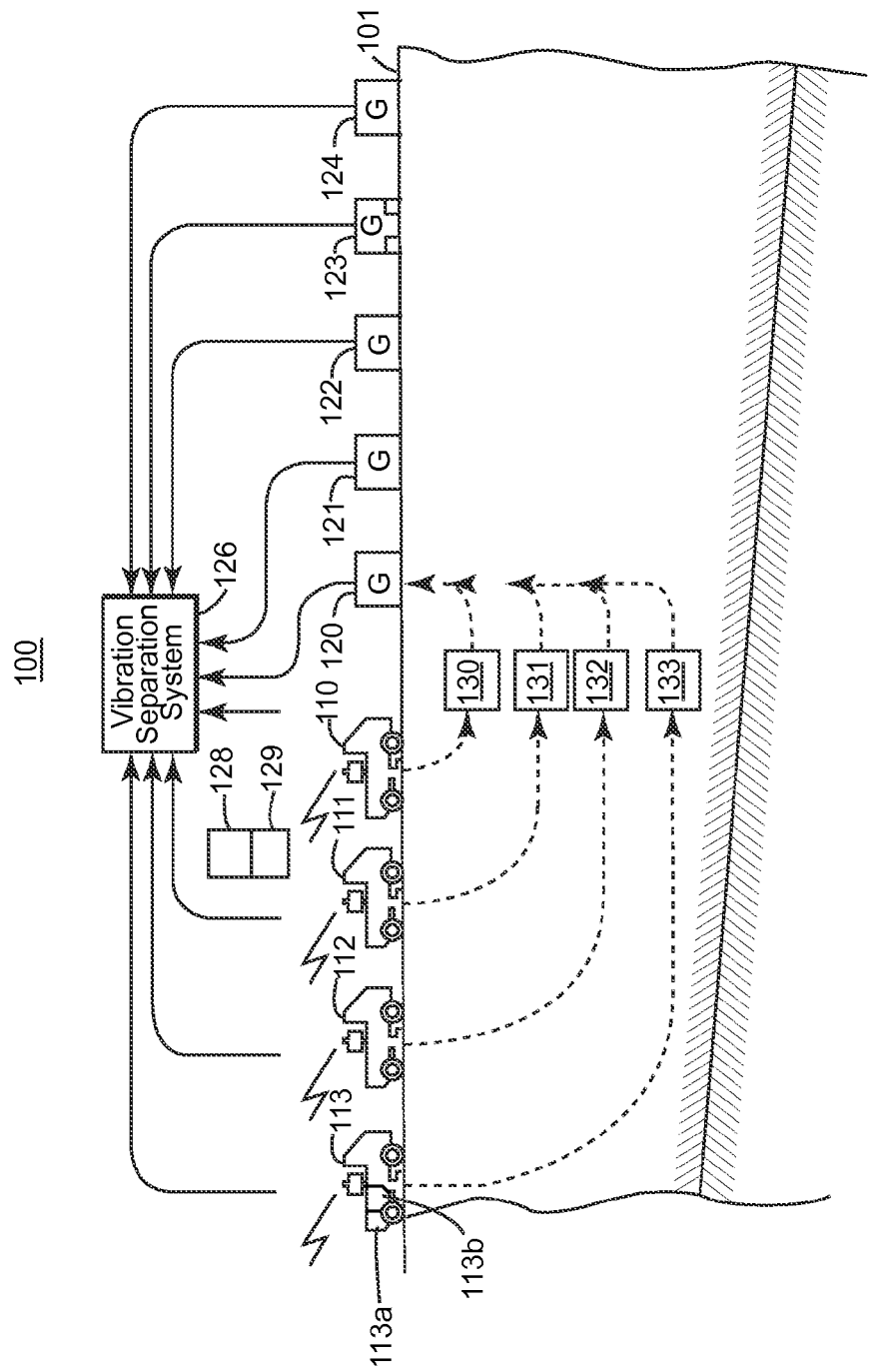
FIG. 1 illustrates a field seismic survey.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system having a single source. However, the embodiments to be discussed next are not limited to a system with a single source but they may be applied to systems having multiple sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

A method for operating a vibratory source with two different pilot signals that are used alternately to drive the source is described in U.S. Provisional Patent Application Ser. No. 61/716,110 (herein '110), filed on Oct. 19, 2012, the entire content of which is incorporated herein by reference. This application describes that the second pilot signal may be a time-reversed version of the first pilot signal. In this way, the IMD noise that occurs in negative time for one sweep can be used to predict IMD noise in the positive time for the other sweep and vice versa. The pilot signals may be a traditional sweep signal, e.g., a sine function, or a pseudo-random sweep, as discussed, for example, in U.S. Pat. No. 7,859,945 (herein '945), the entire content of which is incorporated herein by reference.

Before discussing in more detail a novel method for IMD noise mitigation, a land seismic system 100 that generates and also collects seismic data is discussed with reference to FIG. 1. Consider the configuration of a system 100 for land generating and collecting seismic data. The exemplary survey system 100 includes four vibrators 110, 111, 112, and 113 placed at the surface of the earth 101. Vibrators 110, 111, 112, and 113 may be conventional truck-mounted vertical P-wave vibrators; however, it is understood that other vibrators, such as horizontal shear-wave vibrators, may be utilized or even a mixture of both P-wave and shear wave vibrators. The deployment of the vibrators may vary widely depending upon the survey requirements. For example, for a 3-D survey the vibrators may be spaced far apart and not collinear with one another.

Each vibrator may be equipped with a sweep generator module and control system electronics. For example, FIG. 1 shows vibrator 113 having the sweep generator module 113a and the control system electronics 113b. After receiving a start command, for example, initiated via a telemetry link with the recording system or by the operator of the vibrator, each vibrator begins sweeping. As discussed above, the vibrators are not coordinated to sweep simultaneously, which is different from many existing methods. However, in one application, the vibrators are coordinated to sweep simultaneously. Each vibrator sweep generator may be loaded with a unique pilot signal. In one application, the vibrator sweep generator receives its corresponding pilot signal from a central controller 129. Thus, the pilot signal may be generated locally or centrally.

Sensors (not shown) attached to vibrators 110, 111, 112, and 113 are connected to a vibrator separation system 126. The sensors can be motion sensors, such as accelerometers mounted to the reaction mass, the base plate of the vibrator, or the earth immediately adjacent to the vibrator, a transducer or combination of transducers configured to measure the differential pressure in the actuation chamber of the vibrator, a load cell attached to the bottom of the base plate for measurement of the ground force (contact force), or a weighted sum of the base plate and the reaction mass accelerometers useful for estimating the ground force. Additionally, the sensor could comprise strain gauges mounted on the driven structure of the vibrator to provide an estimate of the ground force. Thus, these sensors provide the ground force signals to the vibrator separation system 126.

Alternatively, (i) the pilot or reference signal generated by the vibrator controller that the vibrator output follows or (ii) a Kalman filter estimate of the ground force provided by the vibrator controller (e.g., available from Sercel, Inc., Houston, Tex.) can be utilized for the sensor movement or (iii) another signal that is representative of the signal imparted into the earth, for example the base plate accelerometer signal. The sensor measurement, or some filtered version of the sensor measurement, is the measured signal and represents the actual source vibration imparted to the earth by the vibrator. In this respect, it is noted that while the vibrator follows a pilot signal, the output of the vibrator (the sweep) may be different from the pilot signal. The measured signals may be transmitted to a recording system 128 by hardwired link, a radio telemetry link, or by a separate acquisition system that records and stores the measured signals so that the measured signals can be integrated with the acquired seismic data set at a later time. The recording system 128 may be implemented in the same hardware as the central controller 129.

Receiver sensors, geophones for example, 120, 121, 122, 123, and 124 are positioned at the surface of the earth 101 in the survey region at locations displaced from the vibrator position. The receiver sensors may be conventional moving coil type geophones, Micro Electro-Mechanical System (MEMS) sensor elements, or hydrophones for transition zone areas like marshes. In some areas, a receiver sensor may include a group of receiver sensors arranged as a receiver array to help attenuate ground roll or other noise modes. Receiver sensors are not limited to vertical component type sensors; horizontal geophones and 3-C geophones/accelerometers may also be used depending upon the nature of the survey to be conducted. For simplicity, receivers 120, 121, 122, 123, and 124 will be considered single component vertical geophones configured to function as point receivers in this embodiment.

As shown in FIG. 1, vibratory energy radiated by each vibrator 110, 111, 112, and 113 travels through the earth from each vibrator to the receiver sensors 120, 121, 122, 123, and 124 in the survey area. The vibratory signal received by each receiver sensor will actually be a composite signal comprised of contributions from each vibratory source. Transfer functions 130, 131, 132, and 133 represent the transmission path response from vibrator 110, 111, 112, and 113 to receiver sensor 120 respectively. The transfer function will depend upon the vibratory signal radiated by each vibrator, the refraction and reflection by the subterranean formations of the vibratory source energy, and the response of the receiver sensor. Subsequent processing steps can be used to remove the embedded response due to the choice of source measured signal and receiver response.

The method for mitigating the IMD noise is now discussed. It is noted that this method may use a single sweep instead of two as discussed above with reference to '110. Note that IMD noise is mainly associated with random sweeps. The method discussed next can also be applied to non-random sweeps, for example, traditional sine sweeps, by replacing the IMD noise term with a harmonic distortion noise term. Thus, the exemplary embodiments discussed next exemplify the IMD noise but the same embodiments can be applied to other distortion models. Considering in one embodiment that the IMD noise refers to an additive noise that corresponds to a difference between a measured ground force gf(t) and a real source s(t) representing the actual propagated signal, an equation describing a relation between the measured seismic data g(t) and the real source s(t) is as follows, where "$\otimes$" represents the convolution operator in the time domain:

$$g(t)=s(t)\otimes h(t)=gf(t)\otimes h(t)+imd(t)\otimes h(t) \quad (1).$$

The ground force gf(t) is measured, for example, with a sensor located at the vibrator, the IMD noise is generated at the vibrator baseplate/earth interface or in close proximity to it primarily due to nonlinearities in the medium (for example soil) beneath the baseplate, and the real source s(t) is the real seismic signal radiated into the earth by the vibrator in response to the applied force. h(t) is the real transfer function (response) of the earth (it cannot be measured exactly because noise is always present), and g(t) is the seismic data recorded with the seismic detectors shown in FIG. 1. Although FIG. 1 shows plural sources, the method now discussed is applied to a single seismic source for simplicity. However, the method may also be applied to plural sources. It is noted that for an ideal case, the ground force gf(t) may be considered to be identical to the pilot signal applied to the source. For this reason, this document refers interchangeably to the (measured) force and the pilot signal as gf(t). Further, it is assumed that a change in the IMD noise from receiver to receiver undergoes the same spectral absorption effect as the first break or inline ground roll signals.

Figure 2:
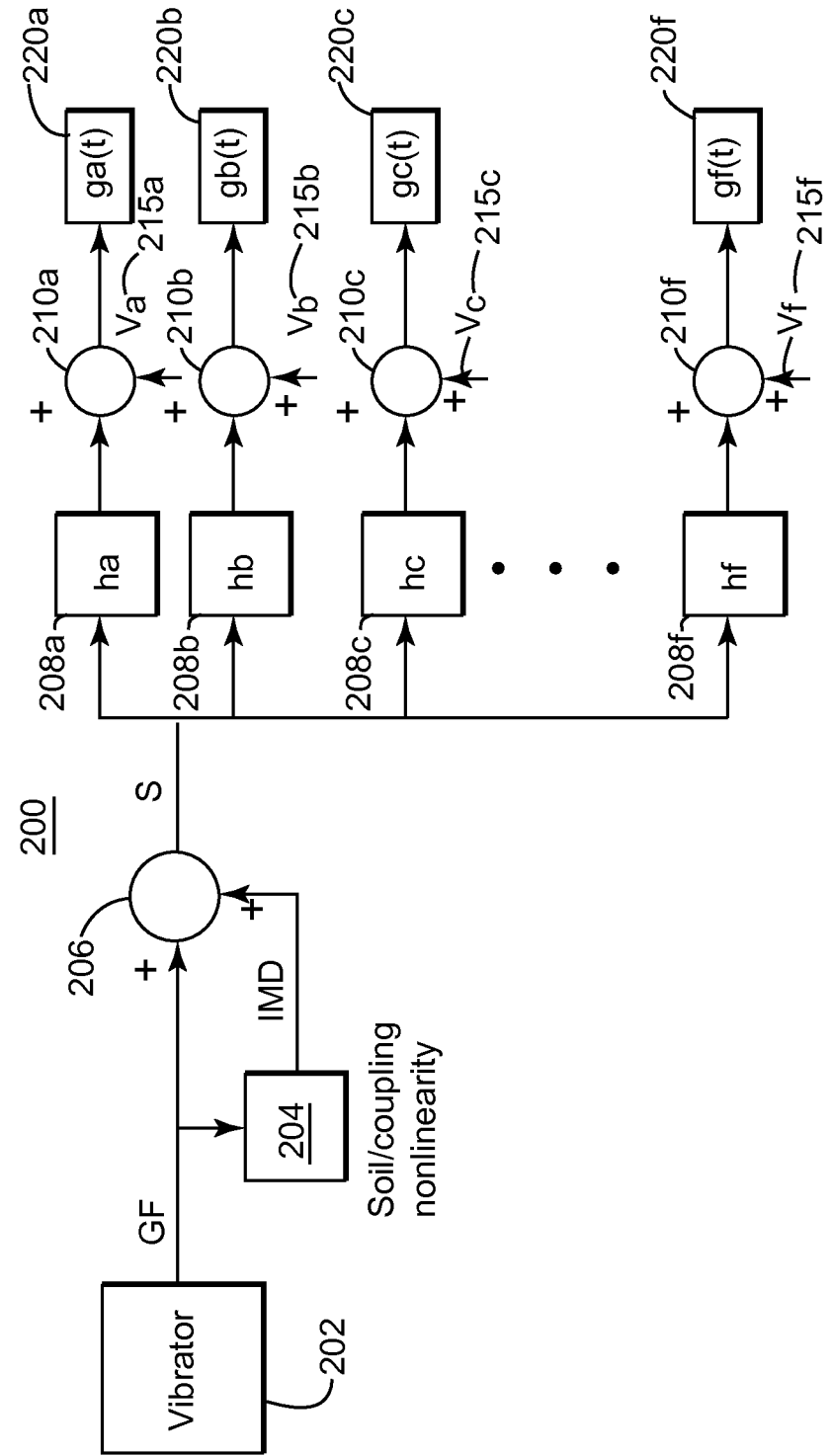
FIG. 2 illustrates an IMD noise model.

An IMD noise model is illustrated in FIG. 2. The model 200 takes into account the ground force gf generated by the vibrator 202, and the IMD noise generated by soil/coupling nonlinearities 204. The addition of these two quantities at block 206 produces the actual radiated signal s. The transfer functions ha to hf represent each wave path from the vibrator to a corresponding receiver 220*a* to 220*f*. For completeness, FIG. 2 also shows summing blocks 210*a* to 210*f* with some additive noise signals Va to Vf that are labeled respectively 215*a* to 215*f*. The signals 215*a* to 215*f* represent noise present near the receiver due to the local environment, noise that is not coherent with the source signal s(t), for example, wind noise, thermal noise or even traffic noise. The detector signals ga(t) to gf(t) are found to be a combination of source produced energy and environmental noise. If the additive environmental noise is ignored, the following equations are generated by model 200:

$$Ga(f)=S(f)Ha(f)=\{GF(f)+IMD(f)\}Ha(f), \quad (2a)$$

$$Gb(f)=S(f)Hb(f)=\{GF(f)+IMD(f)\}Hb(f), \quad (2b)$$

$$Gf(f)=S(f)Hf(f)=\{GF(f)+IMD(f)\}Hf(f), \quad (2f)$$

where equation (1) is written in the time domain and equations (2a-2f) are written in the frequency domain. For the frequency domain, it is noted that a Fourier transform (F{ }) for a real sequences x(t) is given by:

$$F\{x(t)\}=X(f),$$

where X is the Fourier transform of x.

Figure 3:
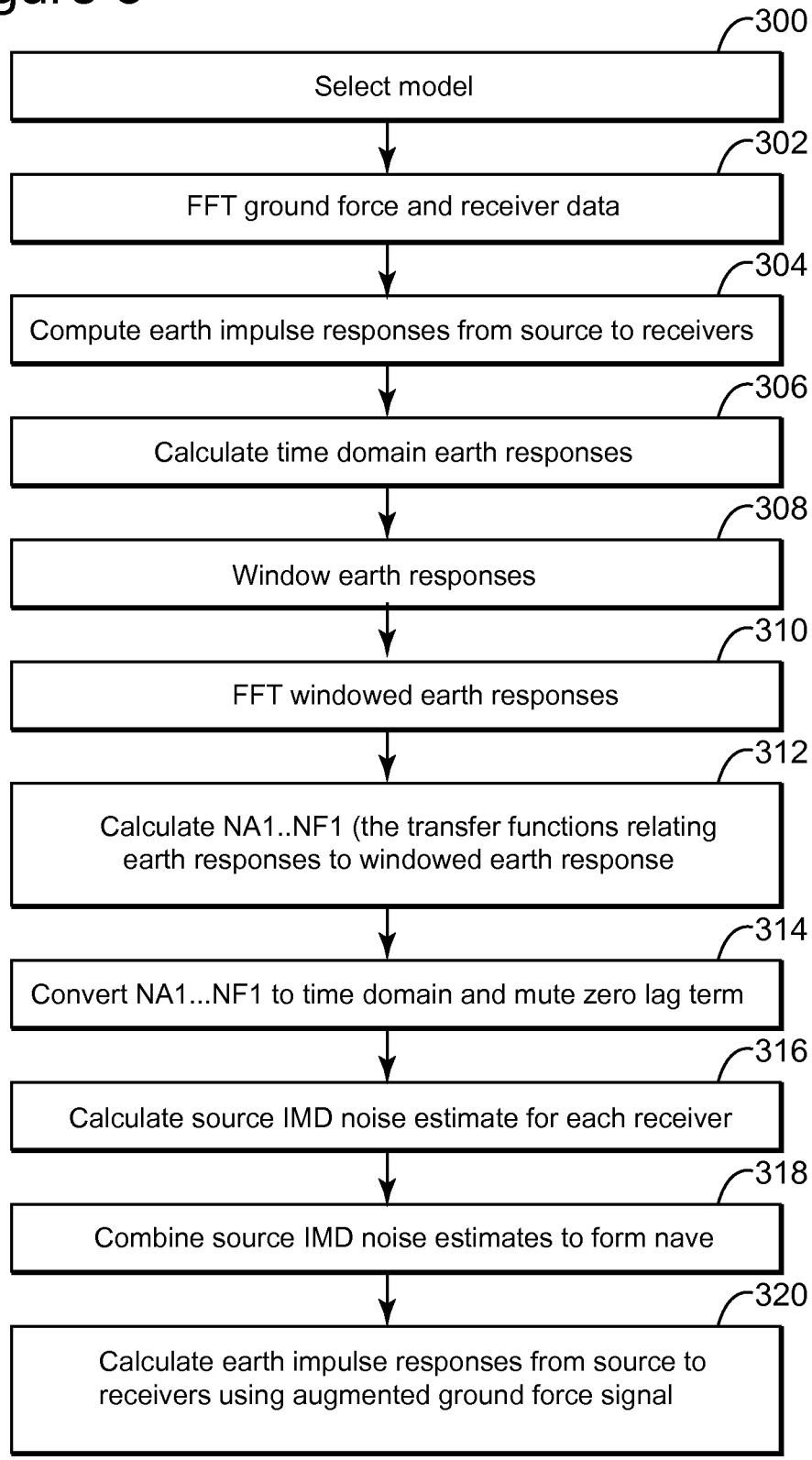
FIG. 3 is a flowchart of a method for calculating IMD noise.

Assuming that a volume of data has been acquired that includes measurements of the ground force signal and receiver signals, a novel method for mitigating IMD source generated noise artifacts in a seismic shot record is illustrated in FIG. 3. FIG. 3 includes a step 300 of selecting a model as discussed above. Then, in step 302, the measured ground force and receiver signals are converted to their frequency domain representations through means of FFT calculations. An initial frequency domain estimate of Ha(f) to Hf(f) that appear in equation (2a-2f) above is calculated in step 304. These initial earth response estimates or earth transfer function estimates are called Ha1(*f*) to Hf1(*f*). Note that identifier "1" indicates a first pass. Later on, additional passes are introduced and they are identified by other identifiers, e.g., "2". Thus, the estimated earth transfer function from the source to the first receiver in the frequency domain is given by:

$$Ha1(f)=Ga(f)/GF(f)=\{1+IMD(f)/GF(f)\}Ha(f)=Ha(f)+Ha(f)\{IMD(f)/GF(f)\} \quad (3)$$

Ha1(f) is shown in equation (3) to include two parts, a first part which is the actual earth response Ha(f) and a second part which is a noise artifact created by the IMD source noise that was not included in the ground force measurement, e.g., Ha(f){IMD(f)/GF(f)}. It is this extra source noise energy that was improperly mapped in the initial earth impulse response calculation that is desired to be estimated to form a new source signal estimate, so that both the ground force signal and the extra IMD source generated noise are all mapped properly and thereby remove the IMD source noise artifacts that are present in, for example, ha1(t), which is the initial time domain estimate of the earth impulse response ha(t).

Considering that A(f) is defined as:

$$A(f)=IMD(f)/GF(f) \quad (4),$$

equation (3) becomes $$Ha1(f)=Ha(f)(1+A(f)) \quad (5a),$$

which is common for all receiver offsets, i.e., $$Hb1(f)=Hb(f)(1+A(f)) \quad (5b)$$

...

$$Hf1(f)=Hf(f)(1+A(f)) \quad (5f).$$

Because response functions ha to hf are different with shifting arrival events, it is possible to combine receiver estimates to determine A(f) and then remove it. One way to determine A(f) is now discussed.

For simplicity, assume that it is desired to remove the IMD noise artifacts from seismic data associated with six detectors (e.g., geophones) closest to the vibrator and these detectors record signals ga to gf. In one application, more or less detectors may be used. Thus, it is possible to compute in step 304 the earth responses Ha1 to Hf1 in the frequency domain by performing a source signature deconvolution using the ground force GF as the source signature in the frequency domain as follows:

$$Ha1(f)=Ga(f)GF(f)^\sim/\{GF(f)GF(f)^\sim+e1\} \quad (6a)$$

$$Hb1(f)=Gb(f)GF(f)^\sim/\{GF(f)GF(f)^\sim+e1\} \quad (6b)$$

...

$$Hf1(f)=Gf(f)GF(f)^\sim/\{GF(f)GF(f)^\sim+e1\}, \quad (6f)$$

where symbol "~" denotes the complex conjugate and e1 is a small quantity used to stabilize spectral division to handle the case where GF(f) may have spectral zeroes.

Figure 4:
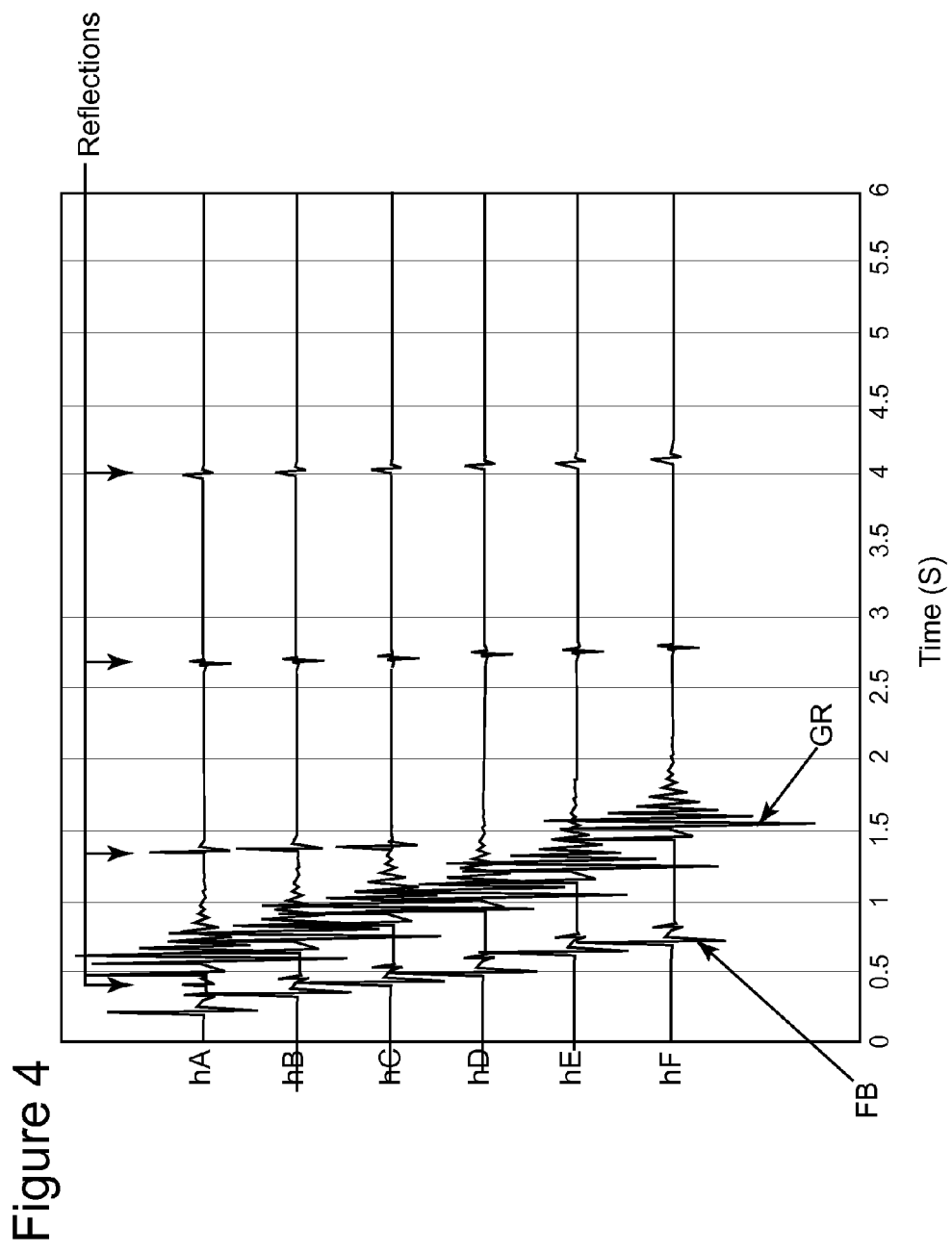
FIG. 4 is a graph illustrating true earth responses.

In step 306, the calculated transfer functions Ha1 to Hf1 are transformed from the frequency domain to the time domain by applying an inverse Fourier transform (IFFT). Thus, the transfer functions ha1 to hf1 are obtained. The true earth responses ha to hf are illustrated in FIG. 4, which also shows the first break transfer function FB and the in line ground roll transfer function GR, that represent the earth impulse response for each of those wave modes.

Figure 5:
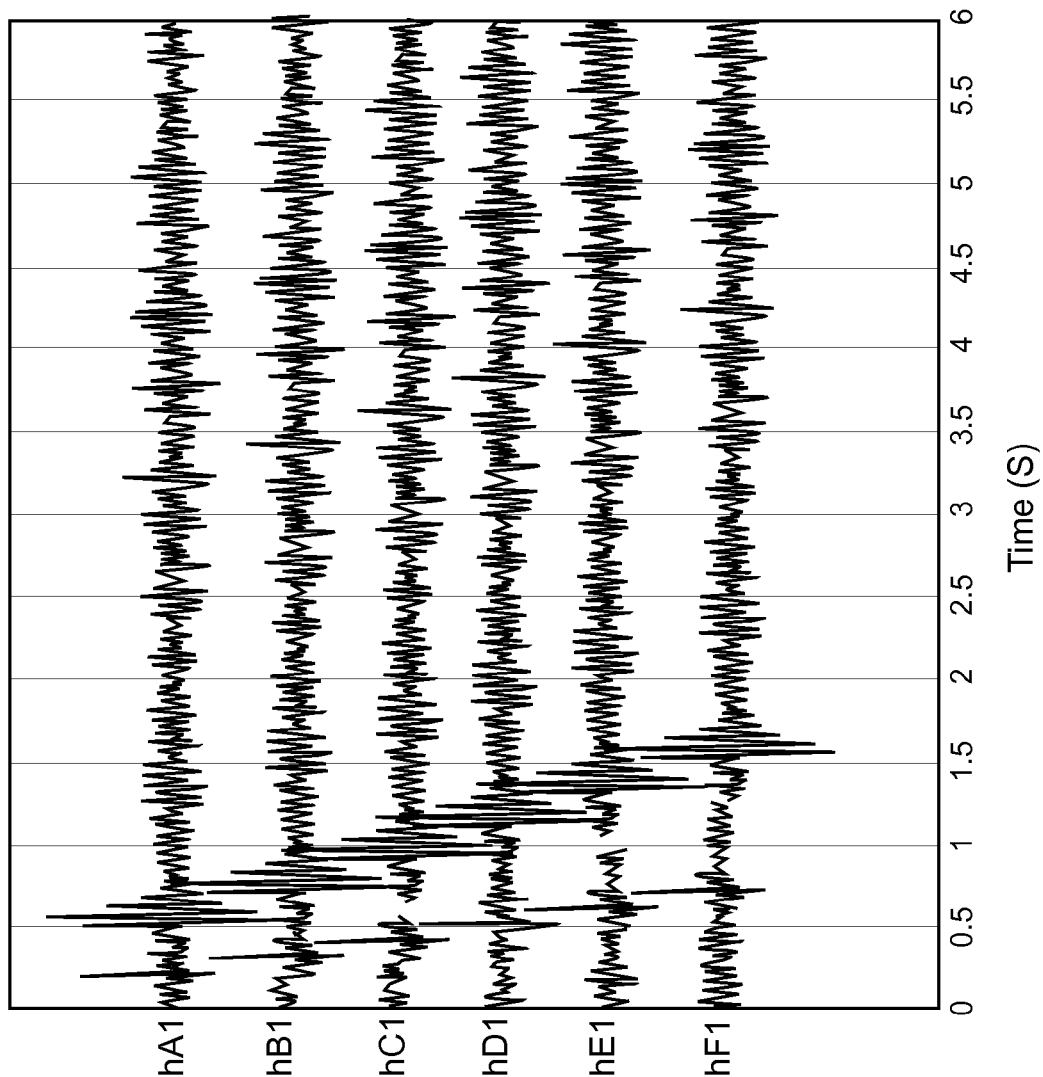
FIG. 5 is a graph illustrating estimating earth responses according to an embodiment.
Figure 6:
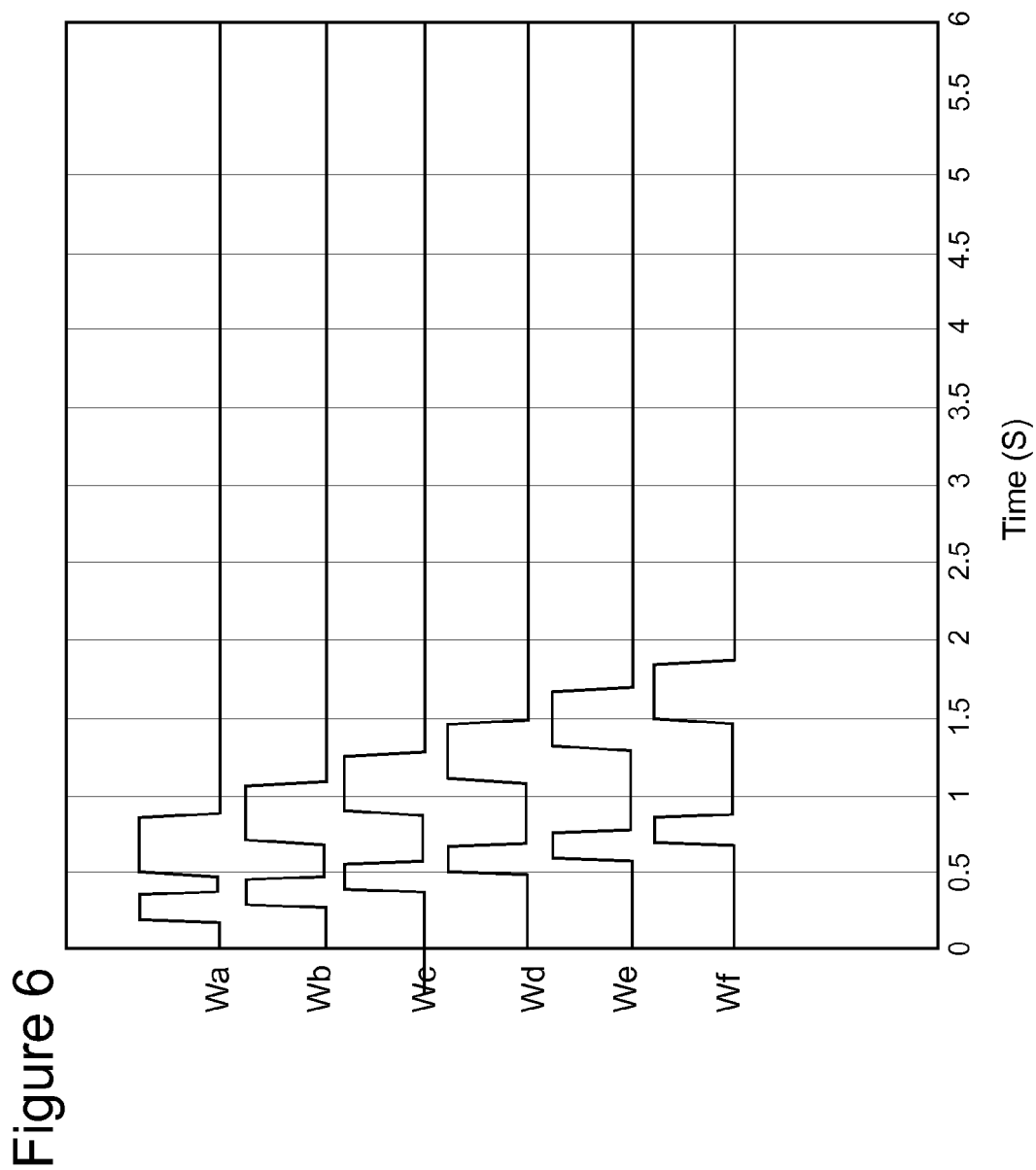
FIG. 6 is a graph illustrating windowing functions to be applied to data according to an embodiment.
Figure 7:
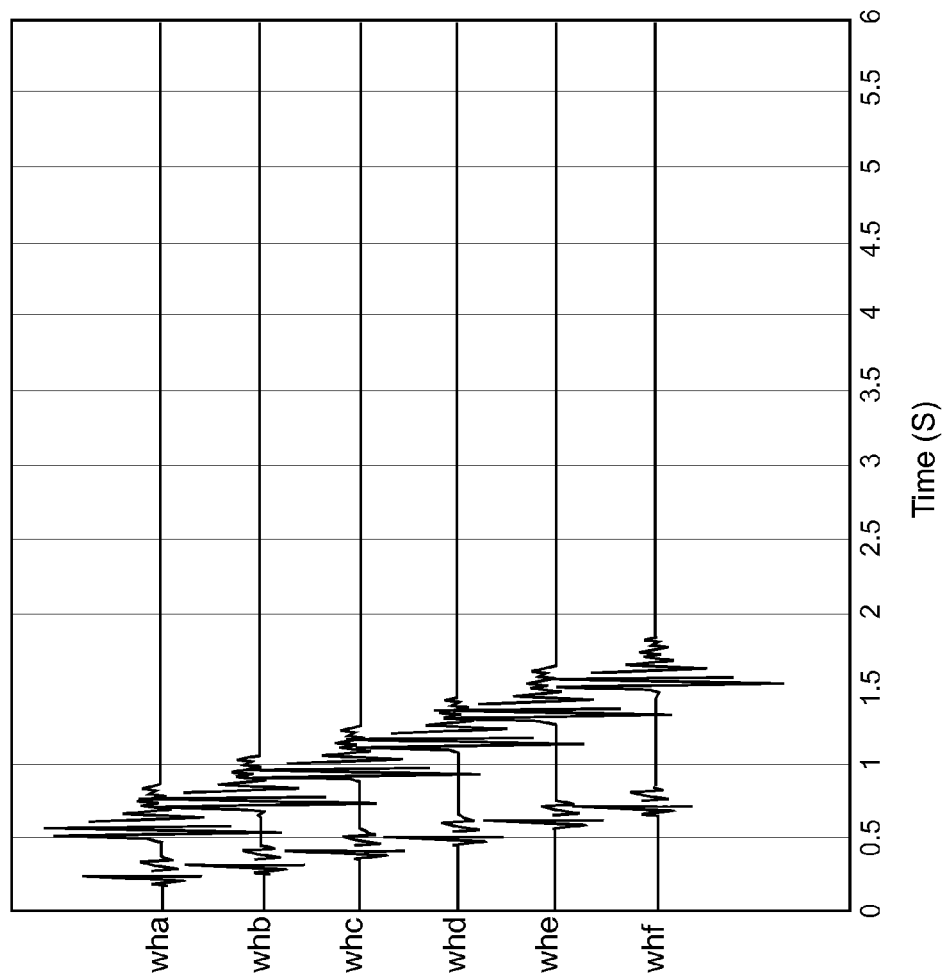
FIG. 7 is a graph illustrating windowed first break wave and ground roll wave according to an embodiment.

The signature deconvolution results (obtained using only the ground force), i.e., the estimated earth responses ha1 to hf1 are illustrated in FIG. 5. Note the rich IMD noise content in FIG. 5. To estimate the IMD noise contribution, the strong arrival events are selected since the strongest IMD artifacts will tend to accompany these events, e.g., the direct p-wave arrival (first break) and the ground roll; and, in the first pass of IMD removal is it intended to extract the IMD noise associated with these events. In step 308, the first break and the ground roll are windowed using window functions wa to wf as illustrated in FIG. 6. The windowed FB and GR transfer functions (wha to whf) are illustrated in FIG. 7.

Returning to FIG. 3, in step 310, the FFT of wha to whf is calculated to obtain their frequency domain representations WHa1 to WHf1. Transfer functions NA1 to NF1 that relate the initial earth response estimates to the windowed earth response estimates are computed at each receiver as discussed next. For each receiver, these transfer functions are calculated in step 312, in the frequency domain, as follows:

$$NA1(f)=Ha1(f)WHa1(f)^\sim/\{WHa1(f)WHa1(f)^\sim+e2\} \quad (7a)$$

$$NB1(f)=Hb1(f)WHb1(f)^\sim/\{WHb1(f)WHb1(f)^\sim+e2\} \quad (7b)$$

...

$$NF1(f)=Hf1(f)WHf1(f)^\sim/\{WHf1(f)WHf1(f)^\sim+e2\}, \quad (7f)$$

where e2 is another small parameter used to stabilize the spectral division process, NA1 is the IMD noise transfer function estimate for receiver 220a in the frequency domain, and Wha1(f) is the frequency domain representation of the windowed transfer function wha for receiver 220a.

The IMD noise transfer function estimates NA1 to NF1 in the frequency domain are each actual estimates of the quantity (1+A(f)) that is common to equations (5a-5f). NA1 to NF1 are then transformed in step 314 into their time domain representations to obtain na1 to nf1 through application of an IFFT. The time domain representations of NA1 to NF1 will each have a spike at or in close proximity to zero lag; this spike represents the portion of the signal in hfa1 that is highly correlated with wha. In other words, for example, because FB and GB events are present in both the unwindowed transfer function ha1(f) and also in the windowed version wha1 in the same positions, this will produce a spike at zero lag. Because the portion of the signal that is creating the IMD noise artifact is desired to be determined and not the contribution due to the measured signal GF, in step 314, the near zero lag terms are removed from the IMD source noise estimates na1 to nf1 to obtain a1 to f1. In step 316, terms a1 to f1 are transformed in the frequency domain by applying a Fourier transform FFT to get A1 to F1. The frequency domain transfer functions A1 to F1 and their corresponding time domain representations a1 to f1, each represent an estimate of the relationship between the unmeasured IMD source generated noise and the measured ground force signal. In other words, A1 to F1 each provide an estimate of the transfer function "A(f)" that appears in equations (5a-5f) above.

In step 316, an IMD source noise is calculated for each receiver using the following process. First the newly obtained terms A1 to F1 are convolved in step 316 with the GF to obtain an IMD source noise estimate for each receiver as follows:

$$NoiseA1(f)=A1(f)GF(f), \quad (8a)$$

$$NoiseB1(f)=B1(f)GF(f), \quad (8b)$$

...

$$NoiseF1(f)=F1(f)GF(f), \quad (8f)$$

and then an inverse Fourier transform is applied to NoiseA1 (f) to NoiseF1(f) in step 316 to obtain IMD noise estimates noiseA1 to noiseF1 in the time domain. Finally, in step 316, any noise that falls outside the source sweep length is removed, because it is assumed that no IMD source noise energy should be produced when the source is inactive.

Figure 8:
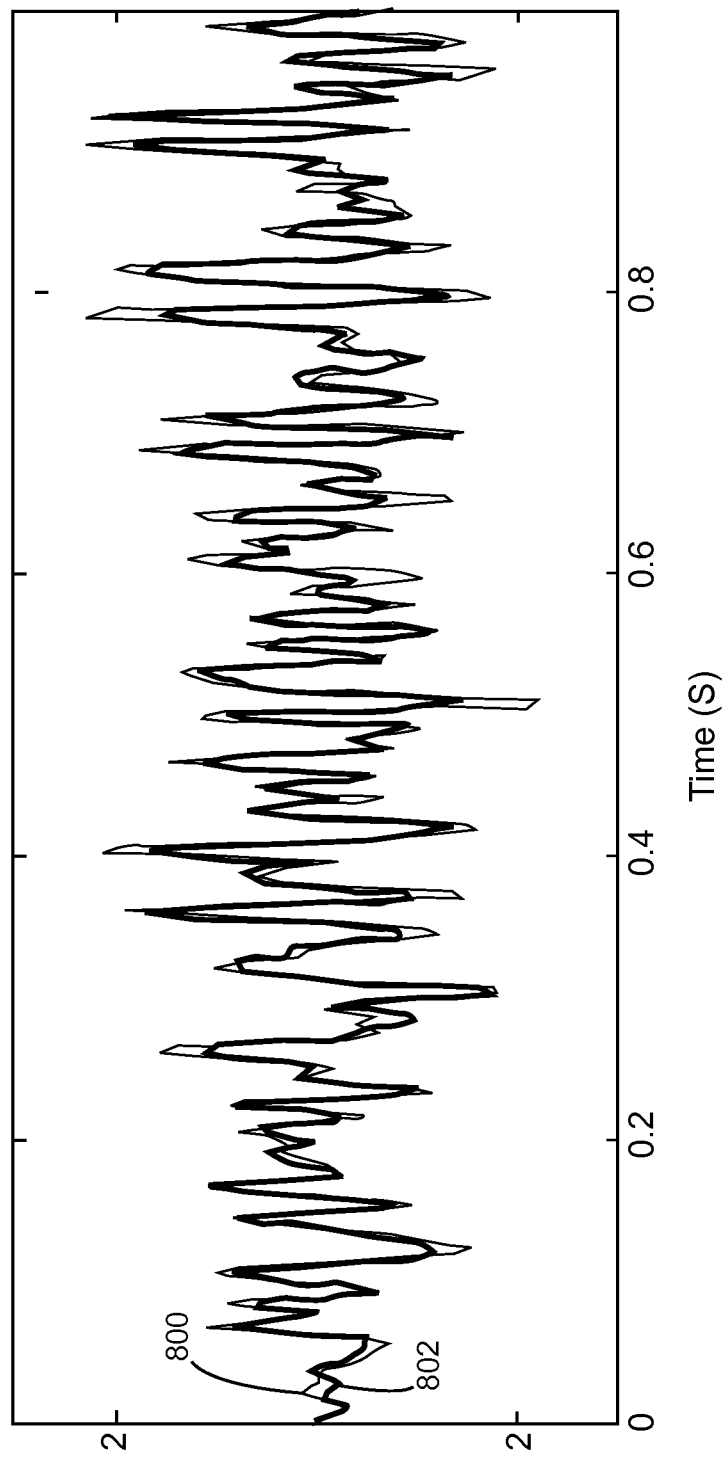
FIG. 8 illustrates a comparison between estimated and actual IMD noise.

In the noise model depicted in FIG. 2 it was assumed the same IMD source noise (i.e., a single IMD noise source) propagates to each receiver filtered only by corresponding earth transmission paths. In other words, noiseA1 to noiseF1 are each estimates of the term labeled IMD in FIG. 2 and in theory, these terms are very close to the same estimate, but in practice they may not be identical either due to artifacts introduced by processing steps like windowing, truncation effects or due to environmental noise. For this reason, the calculated noises noiseA1 to noiseF1 may be combined as shown in step 318 to form the signal nAve1. For simplicity, it is assumed nAve1 to be the mean of the noise estimates; that is, nAve1=(noiseA1+ . . . +noiseF1)/6; however, the combination of the noise estimates is not limited to a simple mean calculation, for example, a weighted average might be used instead if, for example, one receiver had more environmental noise than another or calculation of a trimmed mean could be another option. Referring to FIG. 8, the combined or average noise estimate nAve1 is illustrated as curve 800 while the true noise is illustrated as curve 802. By averaging the individual estimates of the IMD source noise together, an estimate of the actual IMD source noise is improved because the averaging process rejects some of the noncoherent noise that might be present in the record due to environmental noise, like Va . . . Vf (215a-215f) shown in FIG. 2.

To implement the noise mitigation process, a second signature deconvolution of the data is performed in step 320 in the frequency domain. However, during this second signature deconvolution, it is desired to add to the ground force all or a portion of the IMD noise average estimate (nAve1) calculated in the previous steps. Thus, a term k, larger than zero and smaller than or equal to one is added to estimate the amount of correction to be applied. By default, the value of k is one. After frequency transforming nAve1 to form NAve1 through application of an FFT transform, a new estimate S1 of the source signal, which is the original ground force signal augmented by the averaged IMD source noise estimate Nave1, can be written as shown in equation (9):

$$S1(f)=GF1(f)+kNAVe1(f) \quad (9)$$

The equations for the revised earth responses (or transfer functions) in the frequency domain become:

$$Ha2(f)=Ga(f)[S1(f)^*]/\{S1(f)[S1(f)^*]+e3\} \quad (10a)$$

$$Hb2(f)=Gb(f)[S1(f)^*]/\{S1(f)[S1(f)^*]+e3\} \quad (10b)$$

. . .

$$Hf2(f)=Gf(f)[S1(f)^*]/\{S1(f)[S1(f)^*]+e3\}. \quad (10c)$$

Figure 9:
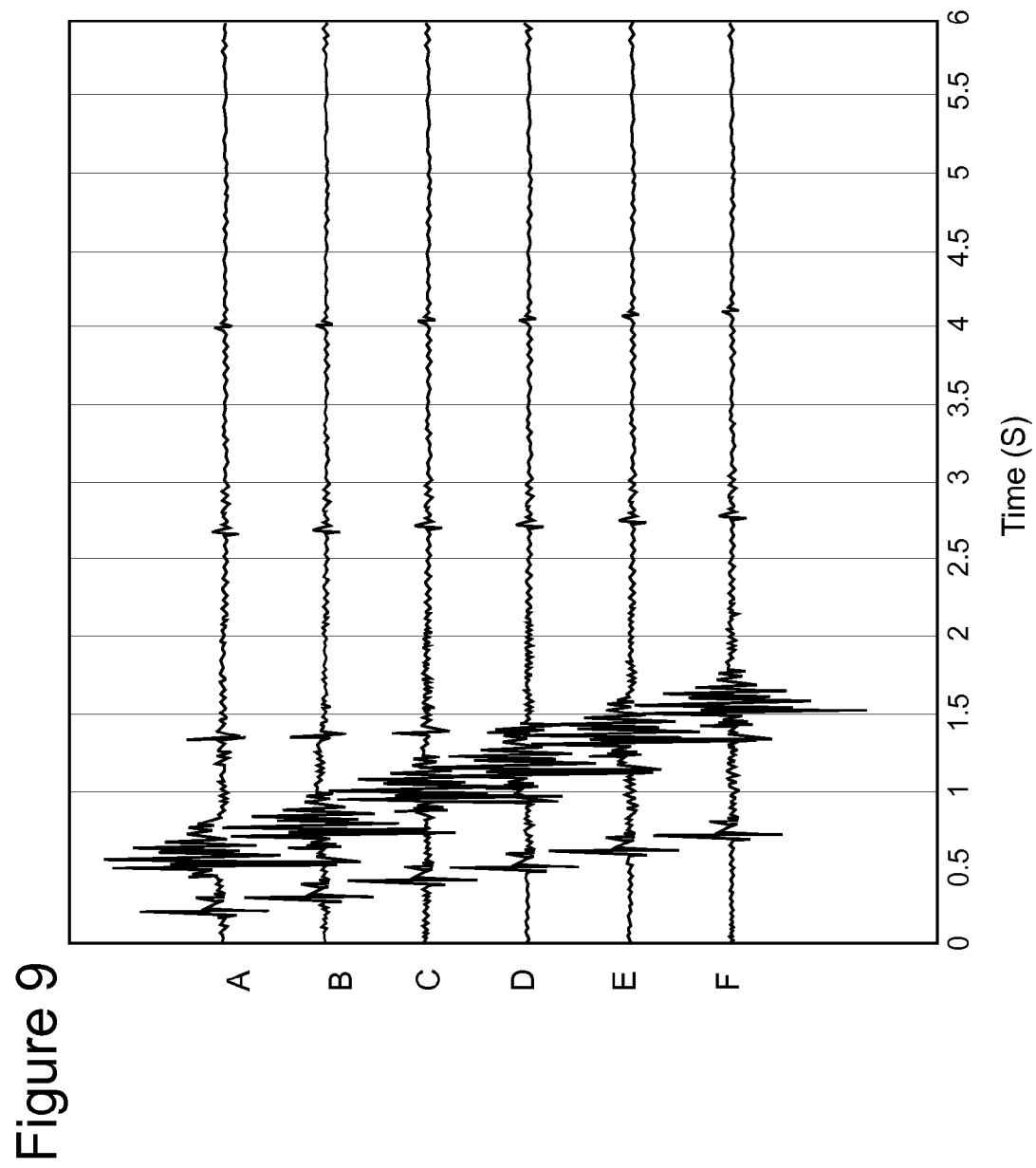
FIG. 9 illustrates IMD noise removal after a first pass according to an embodiment.

After calculating the transfer functions Ha2 to Hf2 in the frequency domain, an inverse Fourier transform IFFT may be applied to calculate the earth responses ha2 to hf2. Thus, ha2 to hf2 represent the new estimate of the earth impulse response between the unmeasured source signal "s(t)" and the various received signals "ga(t) to gf(t)". FIG. 9 illustrates the IMD noise mitigation after this first pass of IMD noise mitigation.

Figure 10:
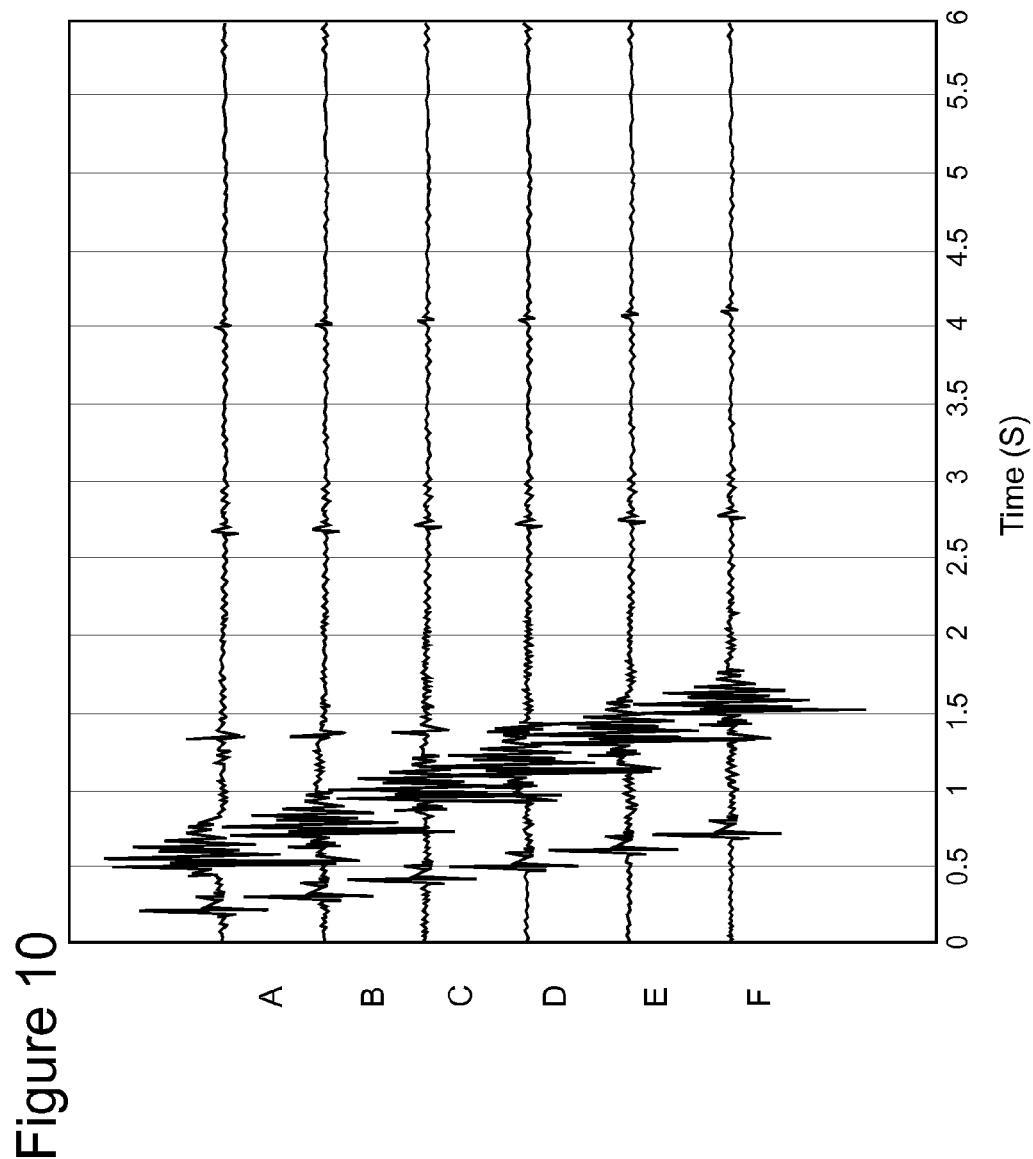
FIG. 10 illustrates IMD noise removal after a second pass according to an embodiment.

A second pass of IMD noise estimation and IMD noise removal can be performed. The process is much the same as has been explained above. For a second pass, the new estimate of the signal that went into the ground S1 is used in place of the ground force GF. Thus, signal S1 replaces the ground force signal GF in the algorithm; and, a new estimate is made of the residual IMD noise not included in the previous estimate. During a second pass, it is possible to use a window extending from the beginning of the first break arrival FB to the end of the listen time; thereby the window covers all arrivals of interest, rather than just the first break and ground roll transfer functions. FIG. 10 illustrates the IMD noise mitigation after a second pass of IMD noise removal. If needed successive passes of IMD noise removal can be applied following the same sequence as has already been explained.

For simplicity, in the above embodiments, it was assumed that there is one IMD non-linear mechanism. However, if two or more such mechanisms are considered, for example, the ground roll IMD is different than the first break ground roll, the model may be partitioned to accommodate these mechanisms. Also, the above model has been discussed with regard to a single vibrator and a single sweep. However, the method may be extended to multiple vibrators.

Figure 11:
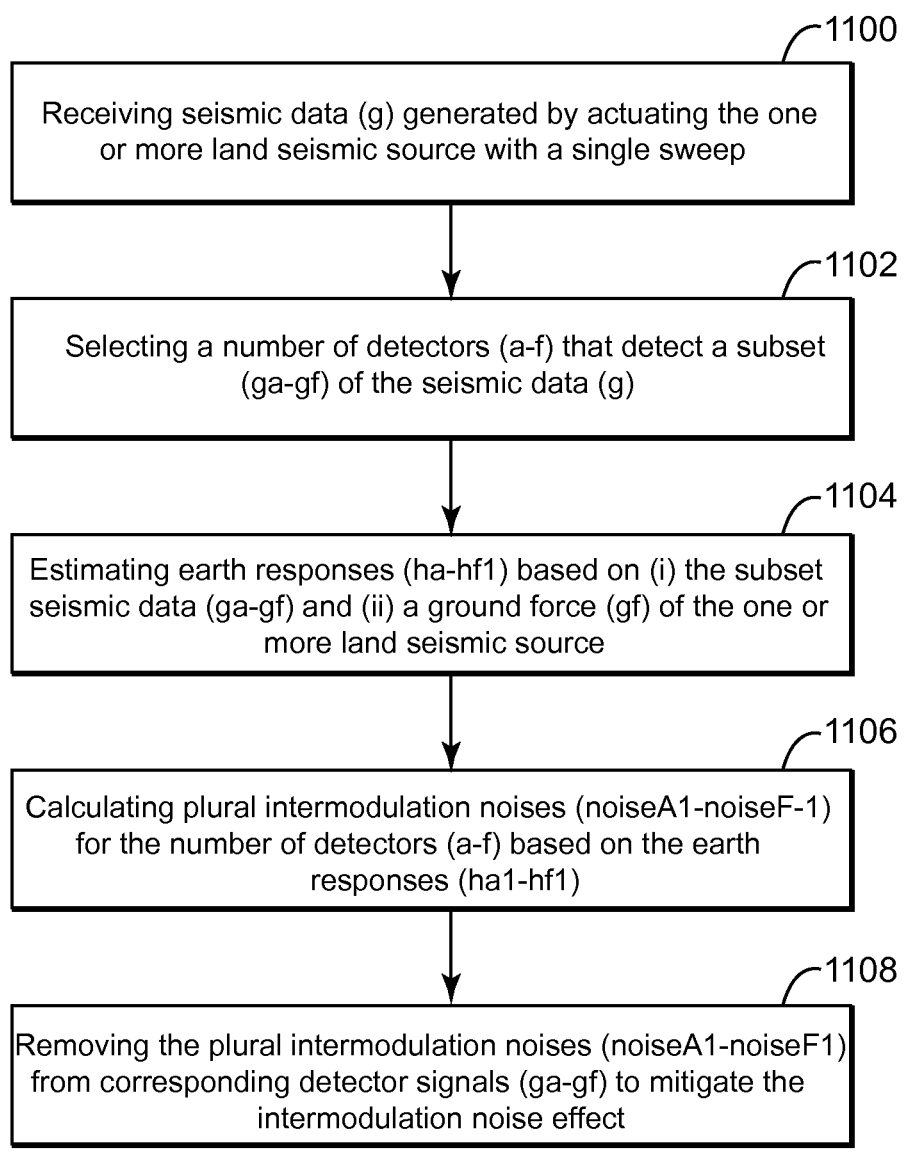
FIG. 11 is a flowchart of a method for mitigating IMD noise according to an embodiment.

According to an embodiment, a method for calculating an intermodulation noise effect generated with one or more land seismic sources is discussed with regard to FIG. 11. The method includes a step 1100 of receiving seismic data (g) generated by actuating the one or more land seismic source with a single sweep; a step 1102 of selecting a number of detectors (a-f) that detect a subset (ga-gf) of the seismic data (g); a step 1104 of estimating earth responses (ha1-hf1) based on (i) the subset seismic data (ga-gf) and (ii) a ground force (gf) of the one or more land seismic source; a step 1106 of calculating plural intermodulation noises (noiseA1-noiseF1) for the number of detectors (a-f) based on the earth responses (ha1-hf1); and a step 1108 of removing the plural intermodulation noises (noiseA1-noiseF1) from corresponding detector signals (ga-gf) to mitigate the intermodulation noise effect.

Figure 12:
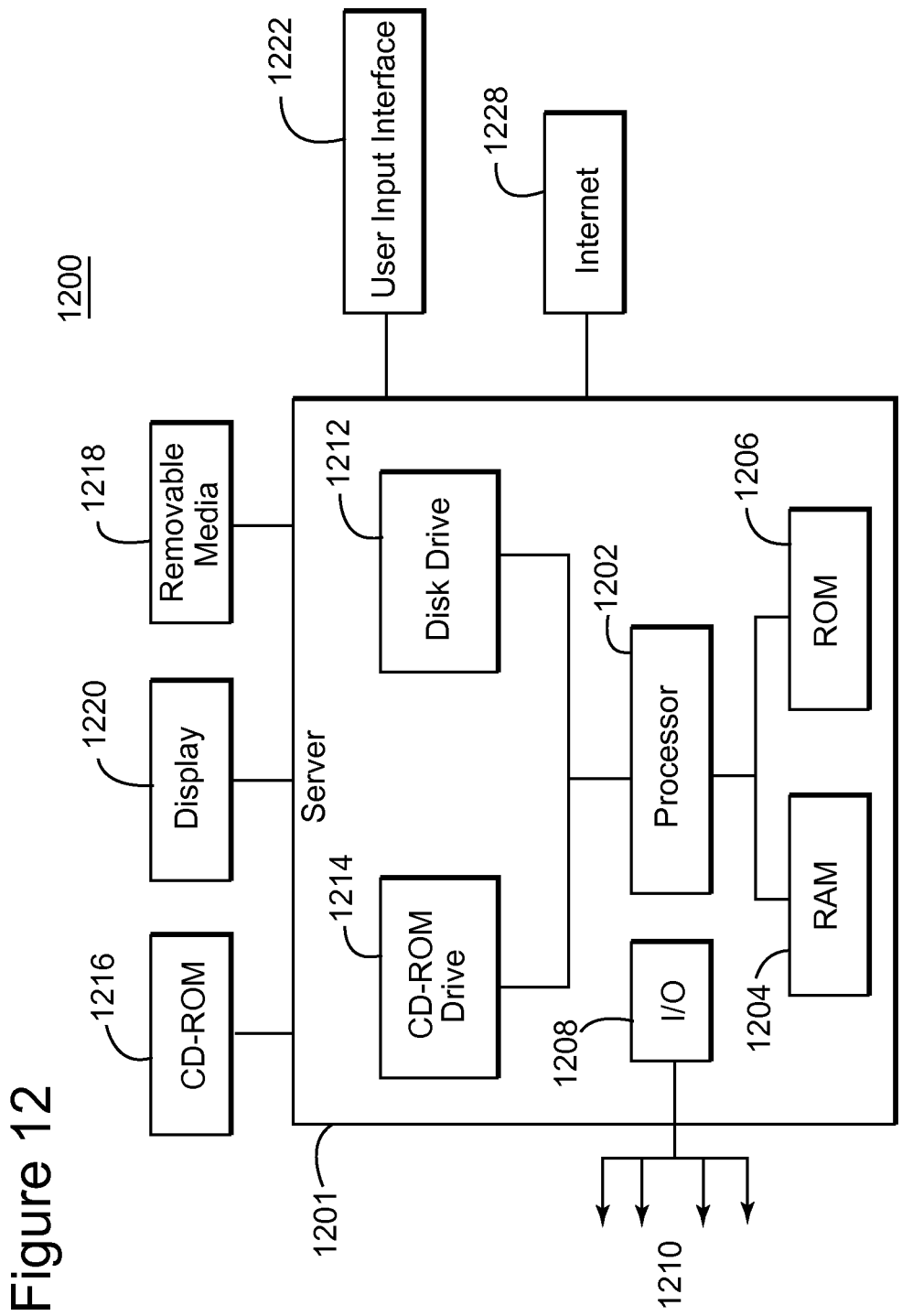
FIG. 12 is a schematic diagram of a computing device configured to run a method for mitigating IMD noise.

One or more of the steps of the above methods may be implemented in a computing system specifically configured to calculate the IMD noise. An example of a representative computing system capable of carrying out operations in accordance with the exemplary embodiments is illustrated in FIG. 12. Hardware, firmware, software or a combination thereof may be used to perform the various steps and operations described herein. The computing system may be one of elements 126, 128 and 129 or may be implemented in one or more of these elements.

The exemplary computing system 1200 suitable for performing the activities described in the exemplary embodiments may include server 1201. Such a server 1201 may include a central processor (CPU) 1202 coupled to a random access memory (RAM) 1204 and to a read-only memory (ROM) 1206. The ROM 1206 may also be other types of storage media to store programs, such as programmable ROM (PROM), erasable PROM (EPROM), etc. The processor 1202 may communicate with other internal and external components through input/output (I/O) circuitry 1208 and bussing 1210, to provide control signals and the like. The processor 1202 carries out a variety of functions as is known in the art, as dictated by software and/or firmware instructions.

The server 1201 may also include one or more data storage devices, including a hard drive 1212, CD-ROM drives 1214, and other hardware capable of reading and/or storing information such as DVD, etc. In one embodiment, software for carrying out the above discussed steps may be stored and distributed on a CD-ROM 1216, removable memory device 1218 or other form of media capable of portably storing information. These storage media may be inserted into, and read by, devices such as the CD-ROM drive 1214, the disk drive 1212, etc. The server 1201 may be coupled to a display 1220, which may be any type of known display or presentation screen, such as LCD displays, LED displays, plasma display, cathode ray tubes (CRT), etc. A user input interface 1222 is provided, including one or more user interface mechanisms such as a mouse, keyboard, microphone, touch pad, touch screen, voice-recognition system, etc.

The server 1201 may be coupled to other computing devices, such as the landline and/or wireless terminals via a network. The server may be part of a larger network configuration as in a global area network (GAN) such as the Internet 1228, which allows ultimate connection to the various landline and/or mobile client devices. The computing device may be implemented on a vehicle that performs a land seismic survey.

The disclosed exemplary embodiments provide a system and a method for actuating sources asynchronously. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating an intermodulation noise effect generated with one or more land seismic sources, the method comprising:
   receiving seismic data (g) generated by actuating the one or more land seismic source with a single sweep;
   selecting a number of detectors that detect a subset (ga-gf) of the seismic data (g);
   estimating earth responses (ha1-hf1) based on (i) the subset seismic data (ga-gf) and (ii) a ground force (gf) of the one or more land seismic source, wherein an earth response is indicative of a transmission path response from the one or more land seismic source to a corresponding detector;
   calculating plural intermodulation noises (noiseA1-noiseF1) for the number of detectors (a-f) based on the earth responses (ha1-hf1); and
   removing the plural intermodulation noises (noiseA1-noiseF1) from corresponding detector signals (ga-gf) to mitigate the intermodulation noise effect.

2. The method of claim 1, wherein the step of estimating comprises:
   estimating an earth response (Ha1)) in the frequency domain for a given detector; and
   applying in inverse Fourier transform on the earth responses (Ha1-Hf1) in the frequency domain to obtain the earth responses (ha1-hf1) in the time domain.

3. The method of claim 2, wherein the step of calculating further comprises:
   selecting window functions (wa-wf) for windowing strong arrivals;
   applying the window functions to remove everything except first break waves and ground roll waves to obtained windowed earth responses (WHa1-WHf1) in the frequency domain;
   calculating noise transfer functions (NA1-NF1) in the frequency domain based on (i) the earth responses (Ha1-Hf1) in the frequency domain and (ii) windowed earth responses (WHa1-WHf1) in the frequency domain; and
   applying an inverse Fourier transform on the noise transfer functions (NA1-NF1) to obtain noise transfer functions (na1-nf1) in the time domain.

4. The method of claim 3, further comprising:
   removing near zero lag terms from the noise transfer functions (na1-nf1) in the time domain to obtain noise terms (a1-f1) in the time domain; and
   applying a Fourier transform to the noise terms (a1-f1) in the time domain to obtain noise terms (A1-F1) in the frequency domain.

5. The method of claim 4, further comprising:
   convolving the noise terms (A1-F1) in the frequency domain with the ground force (GF) in the frequency domain to obtain plural intermodulation noises (NoiseA1-NoiseF1) in the frequency domain.

6. The method of claim 5, further comprising:
   applying an inverse Fourier transform to the plural intermodulation noises (NoiseA1-NoiseF1) in the frequency domain to obtain the plural intermodulation noises (noiseA1-noiseF1) in the time domain.

7. The method of claim 6, further comprising:
   calculating a combined noise estimate (nAve1) based on the plural intermodulation noises (noiseA1-noiseF1) in the time domain.

8. The method of claim 7, further comprising:
   calculating revised earth responses (ha2-hf2) based on (i) the subset seismic data (ga-gf), (ii) the ground force (gf) of the one or more land seismic source, and (iii) a product of a constant k and the combined noise estimate (nAve1).

9. The method of claim 8, wherein the constant k is larger than zero is smaller than or equal to one.

10. A computing device for calculating an intermodulation noise effect generated with one or more land seismic sources, the computing device comprising:
    an interface for receiving seismic data (g) generated by actuating the one or more land seismic source with a single sweep; and
    a processor connected to the interface and configured to,
    select a number of detectors that detect a subset (ga-gf) of the seismic data (g),
    estimate earth responses (ha1-hf1) based on (i) the subset seismic data (ga-gf) and (ii) a ground force (gf) of the one or more land seismic source, wherein an earth response is indicative of a transmission path response from the one or more land seismic source to a corresponding detector, calculate plural intermodulation noises (noiseA1-noiseF1) for the number of detectors (a-f) based on the earth responses (ha1-hf1), and remove the plural intermodulation noises (noiseA1-noiseF1) from corresponding detector signals (ga-gf) to mitigate the intermodulation noise effect.

11. The device of claim 10, wherein the processor is further configured to:

estimate an earth response (Ha1) in the frequency domain for a given detector; and apply in inverse Fourier transform on the earth responses (Ha1-Hf1) in the frequency domain to obtain the earth responses (ha1-hf1) in the time domain.

12. The device of claim 11, wherein the processor is further configured to:

select window functions (wa-wf) for windowing strong arrivals;

apply the window functions to remove everything except first break waves and ground roll waves to obtained windowed earth responses (WHa1-WHf1) in the frequency domain;

calculate noise transfer functions (NA1-NF1) in the frequency domain based on (i) the earth responses (Ha1-Hf1) in the frequency domain and (ii) windowed earth responses (WHa1-WHf1) in the frequency domain; and apply an inverse Fourier transform on the noise transfer functions (NA1-NF1) to obtain noise transfer functions (na1-nf1) in the time domain.

13. The device of claim 12, wherein the processor is further configured to:

remove near zero lag terms from the noise transfer functions (na1-nf1) in the time domain to obtain noise terms (a1-f1) in the time domain; and apply a Fourier transform to the noise terms (a1-f1) in the time domain to obtain noise terms (A1-F1) in the frequency domain.

14. The device of claim 13, wherein the processor is further configured to:

convolve the noise terms (A1-F1) in the frequency domain with the ground force (GF) in the frequency domain to obtain plural intermodulation noises (NoiseA1-NoiseF1) in the frequency domain.

15. The device of claim 14, wherein the processor is further configured to:

apply an inverse Fourier transform to the plural intermodulation noises (NoiseA1-NoiseF1) in the frequency domain to obtain the plural intermodulation noises (noiseA1-noiseF1) in the time domain.

16. The device of claim 15, wherein the processor is further configured to:

calculate a combined noise estimate (nAve1) based on the plural intermodulation noises (noiseA1-noiseF1) in the time domain.

17. The device of claim 16, wherein the processor is further configured to:

calculate revised earth responses (ha2-hf2) based on (i) the subset seismic data (ga-gf), (ii) the ground force (gf) of the one or more land seismic source, and (iii) a product of a constant k and the combined noise estimate (nAve1).

18. The device of claim 17, wherein the constant k is larger than zero is smaller than or equal to one.

19. The device of claim 17, wherein the processor is further configured to:

calculate refined plural intermodulation noises (noiseA2-noiseF2) based on the revised earth responses (ha2-hf2).

20. A non-transitory computer readable medium including computer executable instructions, wherein the instructions, when executed by a computer, implement a method for calculating intermodulation noise generated with one or more land seismic sources, the method comprising:

receiving seismic data (g) generated by actuating the one or more land seismic source with a single sweep;

selecting a number of detectors that detect a subset (ga-gf) of the seismic data (g);

estimating earth responses (ha1-hf1) based on (i) the subset seismic data (ga-gf) and (ii) a ground force (gf) of the one or more land seismic source, wherein an earth response is indicative of a transmission path response from the one or more land seismic source to a corresponding detector;

calculating plural intermodulation noises (noiseA1-noiseF1) for the number of detectors (a-f) based on the earth responses (ha1-hf1); and removing the plural intermodulation noises (noiseA1-noiseF1) from corresponding detector signals (ga-gf) to mitigate the intermodulation noise effect.

* * * * *